(Model.)

2 Sheets—Sheet 1.

B. GRIFFIN.
CULTIVATOR HOE.

No. 246,124. Patented Aug. 23, 1881.

Witnesses
Anson L. Griffin
Newton P. Fry

Inventor:
Benjamin Griffin

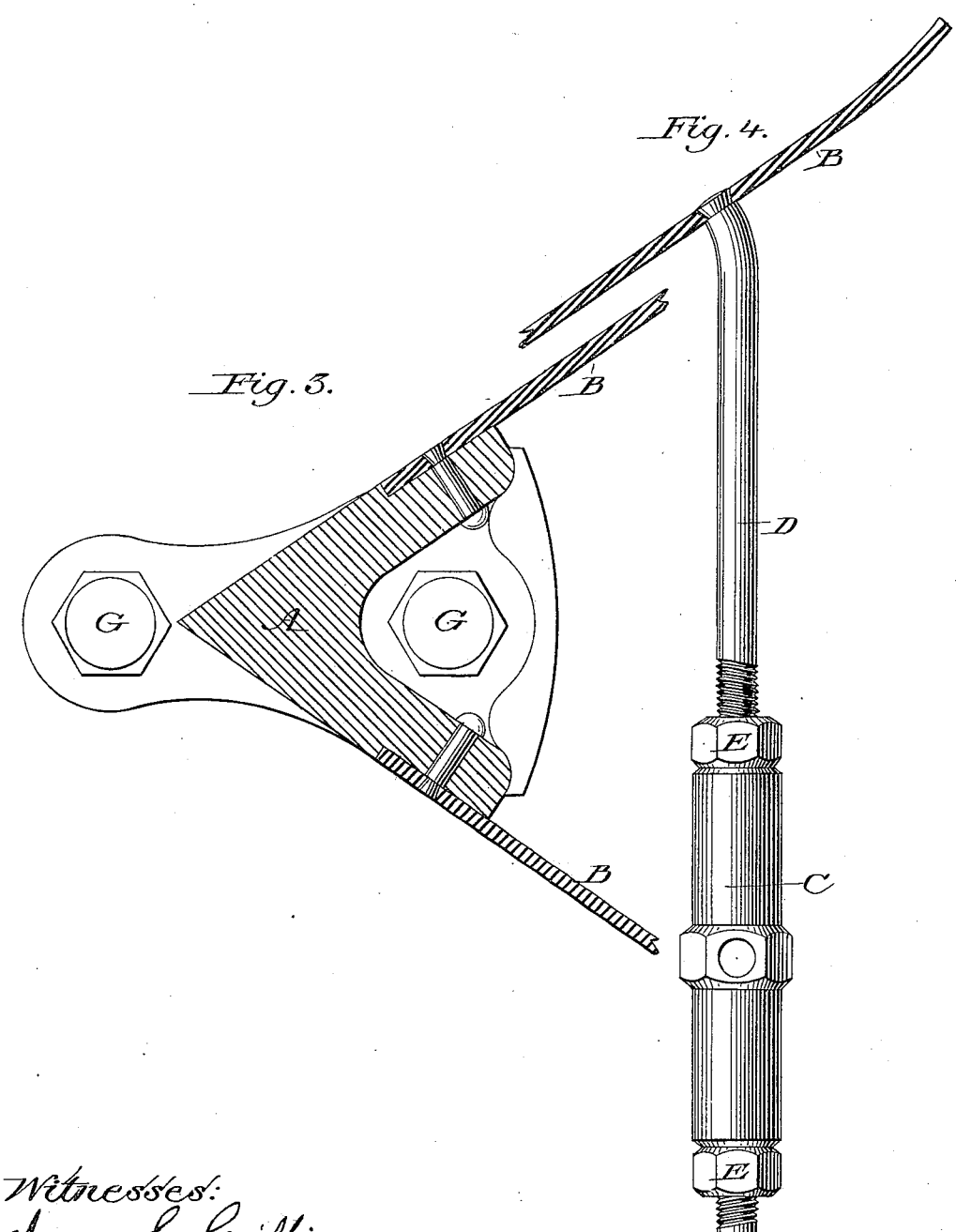

UNITED STATES PATENT OFFICE.

BENJAMIN GRIFFIN, OF LAWRENCE, MASSACHUSETTS.

CULTIVATOR-HOE.

SPECIFICATION forming part of Letters Patent No. 246,124, dated August 23, 1881.

Application filed January 31, 1881. (Model.)

*To all whom it may concern:*

Be it known that I, BENJAMIN GRIFFIN, a citizen of the United States, residing at Lawrence, in the county of Essex and State of Massachusetts, have invented certain new and useful Improvements in Cultivator-Hoes; and I do hereby declare that the following is a full, clear, and exact description of the invention, which will enable others skilled in the art to which it appertains to make and use the same, reference being had to the accompanying drawings, and to the letters of reference marked thereon.

Figure 1:
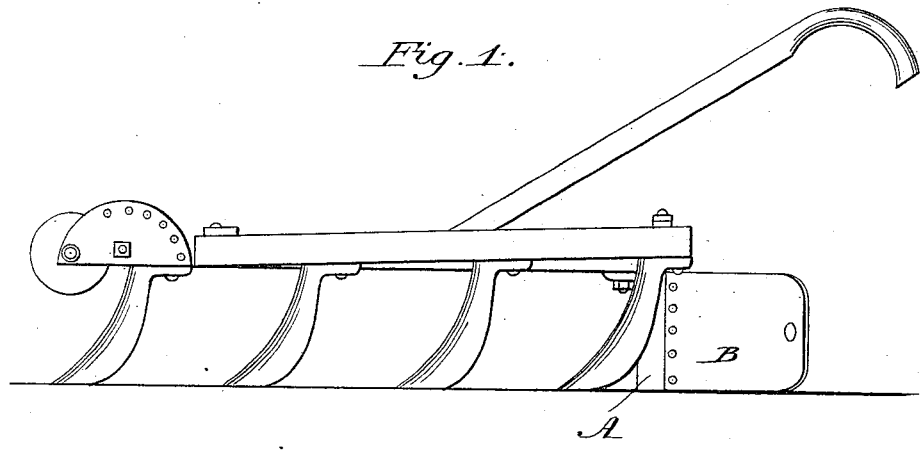
Figure 2:
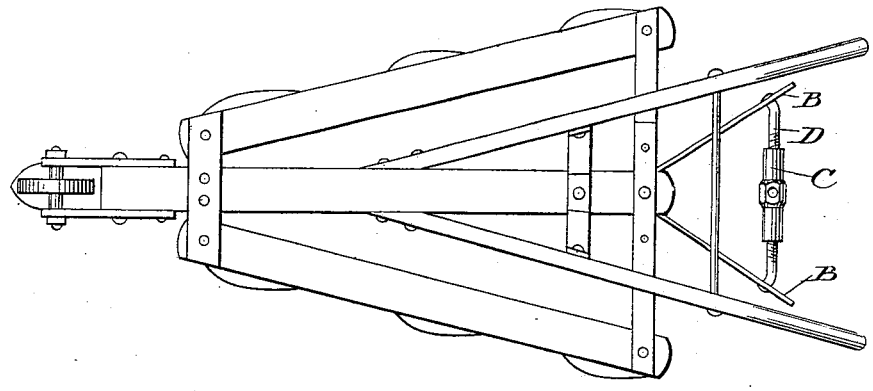

Figure 1 represents a side view of a cultivator with the hoe improvement attached. Fig. 2 represents a top view with the improved attachment; Fig. 3, a section, full size, of the attachment. Fig. 4 represents the spreader C D.

My invention relates to a hoe or molder attachment for cultivators; and it consists of a triangular standard and spring-wings capable of expansion through their elasticity.

In order to make the improvement light and strong, I make the standard or share A of cast-iron seven and one-fourth inches long and three inches by two and one-half inches in section, and adapted to be bolted to the rear end of the middle bar of the cultivator, as seen in plan view, Fig. 3. I then make the wings B of steel or wrought-iron sixteen inches long and seven and one-fourth inches wide, and bolt or rigidly secure them to the standard or share, as seen in Fig. 3. I make the spreader D in two parts, connecting them with coupling-nut C by right and left hand thread, making an extension-spreader. Each outer end is secured to the rear parts of the elastic wings B for the purpose of varying the width of the wings. By turning nut C the wings may be adapted to wide or narrow rows of corn or potatoes, making it available for different kinds of tillage and width of rows.

Having described my invention, what I desire to claim and secure by Letters Patent is—

The combination, with a cultivator, of the triangular standard or share A, bolted to the center beam, the elastic wings B, secured rigidly to said share, and the spreader C D, secured to the inner rear parts of said wings, and adapted to vary the width of the wings by means of their spring or elasticity, substantially as shown and described.

BENJAMIN GRIFFIN.

Witnesses:
SHERMAN W. LADD,
CHARLES V. BELL.